United States Patent
Liu et al.

(10) Patent No.: US 11,208,046 B2
(45) Date of Patent: Dec. 28, 2021

(54) VEHICLE CARGO LOADING SYSTEM

(71) Applicant: KARMA AUTOMOTIVE LLC, Irvine, CA (US)

(72) Inventors: Zhinan Liu, Costa Mesa, CA (US); Andreas Thurner, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 143 days.

(21) Appl. No.: 16/378,235

(22) Filed: Apr. 8, 2019

(65) Prior Publication Data
US 2020/0317135 A1  Oct. 8, 2020

(51) Int. Cl.
*B60R 5/02* (2006.01)
*B62D 25/08* (2006.01)
*B60R 11/00* (2006.01)

(52) U.S. Cl.
CPC ............ *B60R 5/02* (2013.01); *B62D 25/087* (2013.01); *B60R 2011/0038* (2013.01); *B60R 2011/0085* (2013.01); *B60R 2011/0092* (2013.01); *B62D 25/082* (2013.01)

(58) Field of Classification Search
CPC .... B62D 25/087; B60P 1/4407; B60P 1/4435; B60R 2011/0036; B60R 2011/0038; B60R 2011/0085; B60R 5/04; B60R 5/02
USPC ......................................... 296/37.1; 414/462
See application file for complete search history.

(56) References Cited

U.S. PATENT DOCUMENTS

| | | | | |
|---|---|---|---|---|
| 3,318,471 A | * | 5/1967 | Barr | ......................... B60R 7/10 414/462 |
| 3,627,158 A | * | 12/1971 | Kobasic | .................... B60R 5/04 414/462 |
| 4,136,904 A | | 1/1979 | Lauderdale | |
| 4,452,151 A | * | 6/1984 | Jarrard | ....................... B60R 5/04 108/42 |
| 4,455,948 A | * | 6/1984 | Torres | ..................... A47B 31/06 108/138 |
| 4,799,849 A | * | 1/1989 | Miller | ....................... B60R 5/04 296/37.1 |
| 4,941,797 A | * | 7/1990 | Smillie, III | ............... B60R 5/04 187/269 |

(Continued)

FOREIGN PATENT DOCUMENTS

DE 102018208799 A1 * 12/2019 ............... B60R 5/02
JP 2003-226194 A  8/2003

(Continued)

OTHER PUBLICATIONS

International Search Report and Written Opinion dated Jul. 23, 2020 issued in related International Application No. PCT/US2020/027116; filed Apr. 7, 2020.

*Primary Examiner* — Jason S Morrow
(74) *Attorney, Agent, or Firm* — Gordon Rees Scully Mansukhani, LLP

(57) ABSTRACT

A cargo loading system for loading or unloading cargo to a motor vehicle. The cargo loading system includes a compartment, a cargo storage device within the compartment, and a positioning mechanism. The cargo storage device includes a stored and loading position. The positioning mechanism controls the movement of the cargo storage device between the stored position and loading position. The loading position is positioned so that it is configured to be ease loading and loading of cargo to and from the motor vehicle.

18 Claims, 5 Drawing Sheets

(56) References Cited

U.S. PATENT DOCUMENTS

| | | | | |
|---|---|---|---|---|
| 4,969,793 | A | * | 11/1990 | Pawl .................... B60R 5/04 |
| | | | | 187/269 |
| 5,301,992 | A | * | 4/1994 | Whitmore ................ B60R 5/04 |
| | | | | 224/542 |
| 5,372,289 | A | * | 12/1994 | Dachicourt .............. B60R 7/02 |
| | | | | 224/281 |
| 5,765,987 | A | * | 6/1998 | Zimmermann ........... B60R 5/04 |
| | | | | 414/462 |
| 6,050,202 | A | * | 4/2000 | Thompson ............. B60N 3/001 |
| | | | | 108/144.11 |
| 6,145,447 | A | * | 11/2000 | Henderson ............ B60N 3/001 |
| | | | | 108/115 |
| 9,828,222 | B2 | * | 11/2017 | Nedelman ............. B66F 7/0683 |
| 10,195,999 | B1 | * | 2/2019 | Glickman ............ B62D 25/105 |
| 10,202,081 | B2 | * | 2/2019 | Krishnan ................ B60R 5/045 |
| D862,338 | S | * | 10/2019 | Holzhausen ................ D12/196 |
| 2002/0190536 | A1 | | 12/2002 | Getzschman et al. |
| 2009/0001750 | A1 | * | 1/2009 | Horton ..................... B60R 5/04 |
| | | | | 296/51 |
| 2017/0219071 | A1 | * | 8/2017 | Gurdjian ............. F16H 25/2454 |
| 2019/0142659 | A1 | * | 5/2019 | Celis ................... A61G 3/0808 |
| | | | | 414/462 |
| 2020/0017005 | A1 | * | 1/2020 | Salter ................... B60N 2/0232 |
| 2020/0108688 | A1 | * | 4/2020 | Gruber ................ H01M 10/613 |
| 2020/0262482 | A1 | * | 8/2020 | Makowski ........... B62D 21/152 |
| 2020/0290517 | A1 | * | 9/2020 | Sabdad .................. B60R 11/00 |

FOREIGN PATENT DOCUMENTS

| | | |
|---|---|---|
| KR | 2011-0071244 A | 6/2011 |
| WO | 2008-046461 A1 | 4/2008 |

\* cited by examiner

VEHICLE CARGO LOADING SYSTEM

GENERAL DESCRIPTION

The present disclosure related generally to cargo storage systems for use in vehicles, such as motor vehicles. More specifically a cargo loading system that includes a positioning mechanism for moving a cargo storage device into a more suitable position during loading and unloading.

Motor vehicles include various compartments that are accessible from outside the vehicle, such as an engine compartment or trunk compartment, for example. In electrified vehicles, an additional area normally occupied by an internal combustion engine may be available for added cargo storage under a hood or other closure panel. This cargo storage location is sometimes low to the ground due to physical constraints. A cargo loading system may be used to aid users to position a cargo storage device into a more easily accessible position during loading and unloading. This cargo loading system may also be incorporated to other cargo compartments, such as the rear trunk of the motor vehicle.

SUMMARY

Figure 1:
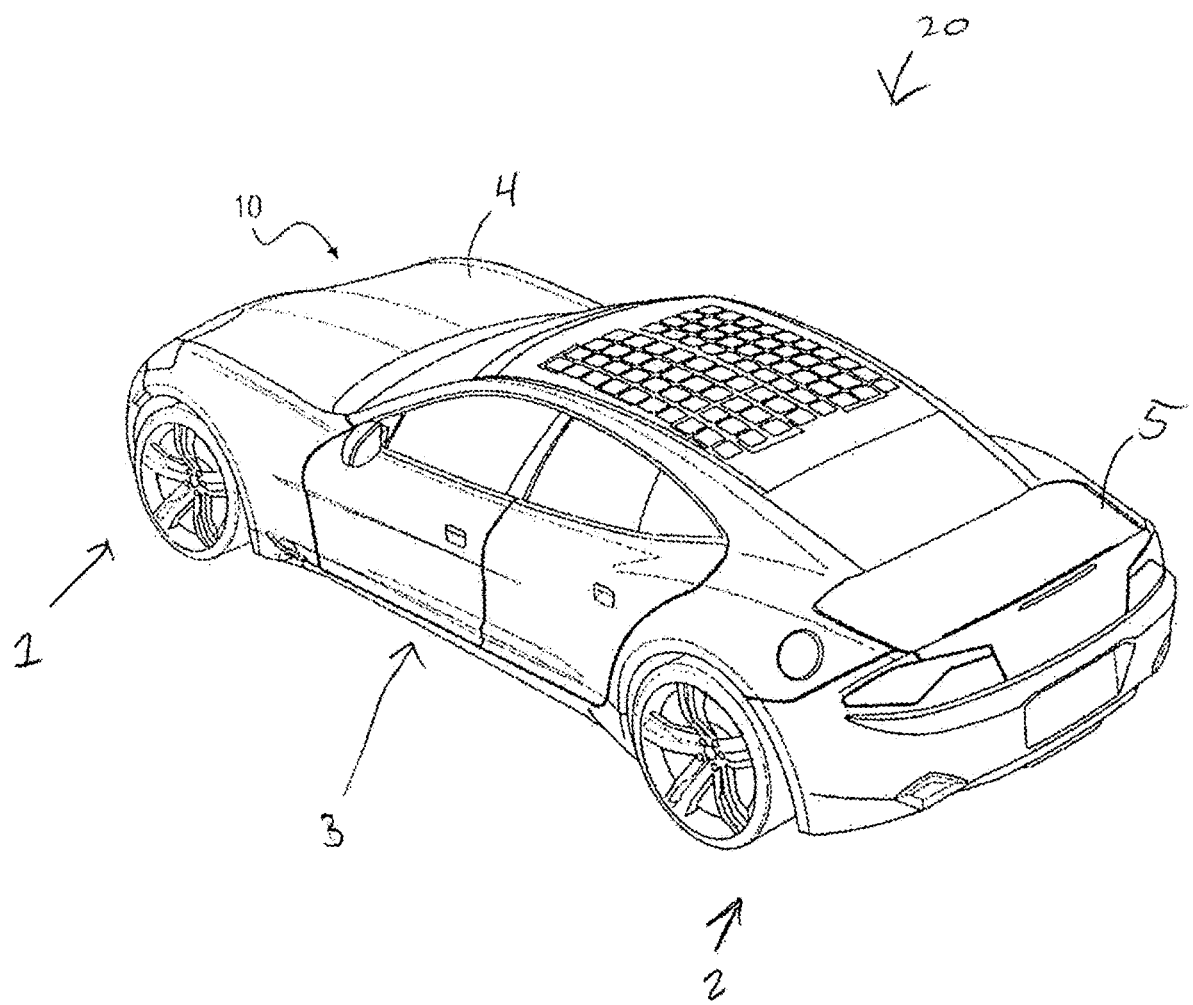
FIG. 1 is a vehicle equipped with a cargo loading system.

An embodiment of a cargo loading system is disclosed herein. The cargo loading system is configured to ease loading and unloading of cargo in a motor vehicle. The cargo loading system may include a compartment under the hood or the trunk of the car. A cargo storage device of the cargo loading system may be placed within the compartment of the vehicle.

The cargo loading system may further include a positioning mechanism configured to control the movement of the cargo storage device from a stored position to the loading or unloading position. The cargo storage device may include an actuated extending rod. The loading or unloading position is generally higher than the stored position. During movement to the stored position the positioning mechanism may pivot the cargo storage device, through motorized means.

In another embodiment of a cargo loading system, loading system may include a line attached to a hood or a trunk such that the opening of the hood pulls the cargo storage device to a loading or unloading position. The loading or unloading position is generally higher than the stored position. This embodiment may include a passive or actuated extending rod. The loading system may also include a hinge or a motor configured to rotate the cargo storage device to the loading or unloading position.

DETAILED DESCRIPTION

A cargo loading system for a vehicle may include a cargo storage device in the compartment of the vehicle. The cargo storage device includes two positions, a stored position, and a loading or unloading position. The stored position is generally active at the position in which the cargo storage device is set when compartment of the vehicle is not open, such as when the vehicle is not in use or when the vehicle in motion. The loading or unloading position is generally active at the position in which the cargo storage device is set when the compartment vehicle is open and is positioned at a different position than the stored position. This cargo loading system may also be incorporated to other cargo compartments, such as the rear trunk of the motor vehicle.

A cargo storage device is configured to hold cargo. Exemplary cargo storage devices may be of a flat platform or a container (e.g., a bucket). The flat platform may contain hooks or shelves for position and securing the location of the cargo. The container can be of different shapes or sizes. The container may be configured to hold a standard sized luggage. Typically, a standard checked luggage size wavers around 27×21×14 inches. Multiple containers may be used as the cargo storage device or, alternatively, a single large container configured to accommodate multiple pieces of luggage or larger sized luggage.

The system includes the ability to adjust the loading and unloading positions for the cargo carrying device. may A positioning mechanism may be provided to control the movement of the cargo storage device from the stored position to the loading position may be utilized. The positioning mechanism may include extending rods to control the movement of the cargo storage device. The extending rods may be active or passive. For example, active extending rods may be driven by a linear actuator, which may be one of a mechanical actuator, hydraulic actuator, pneumatic actuator, or electromechanical actuators. Exemplary passive extending rods may include pneumatic or hydraulic piston cylinder struts. The positioning mechanism may be actuated manually or automatically. In an exemplary embodiment the manual actuation of the positioning mechanism may be of user input either remotely (i.e. from the car key fob) or from the vehicle (i.e. a button in the cargo area). The automatic actuation of the positioning mechanism may be handled by the use of sensors, for example sensors configured to detect the opening of the trunk or hood to automatically actuate the extending rods. In an alternative embodiment the sensors may also detect the presence of a personnel or user in proximity of the compartment or detect hands free gestures such as kick-activation.

The positioning mechanism may also be configured to swivel the cargo storage device during the loading and unloading position on a pivot. Swiveling of the cargo storage device may be carried out by a line or a motor. An exemplary embodiment of a line is a string attached to the hood and the cargo storage device with a pivot located at a desired rotation point on the cargo storage device such that the cargo storage device rotates at the pivot as the hood is opened due to tension of the string. An exemplary embodiment of a motor includes rotary actuators such as electric stepper motors or servomotors to rotate the cargo storage device on the pivot. The motor may also be in mechanical communication the extending rod to rotate the extending rod to control the movement of the cargo storage device.

With reference to FIG. 1, an exemplary embodiment of a vehicle 10 is illustrated and includes a hood 4 located in the front 1 of the vehicle 10. A cargo loading system may be located under the hood. Alternatively, in some embodiments, the cargo loading system may be located in the trunk 5 located at the rear 2 of the vehicle 10. A passenger compartment 3 is located between the rear 2 and front 1 of the vehicle. It should be noted that the cargo loading system disclosed and illustrated herein is exemplary only and does not limit the scope of the claims set forth below.

Figure 2:
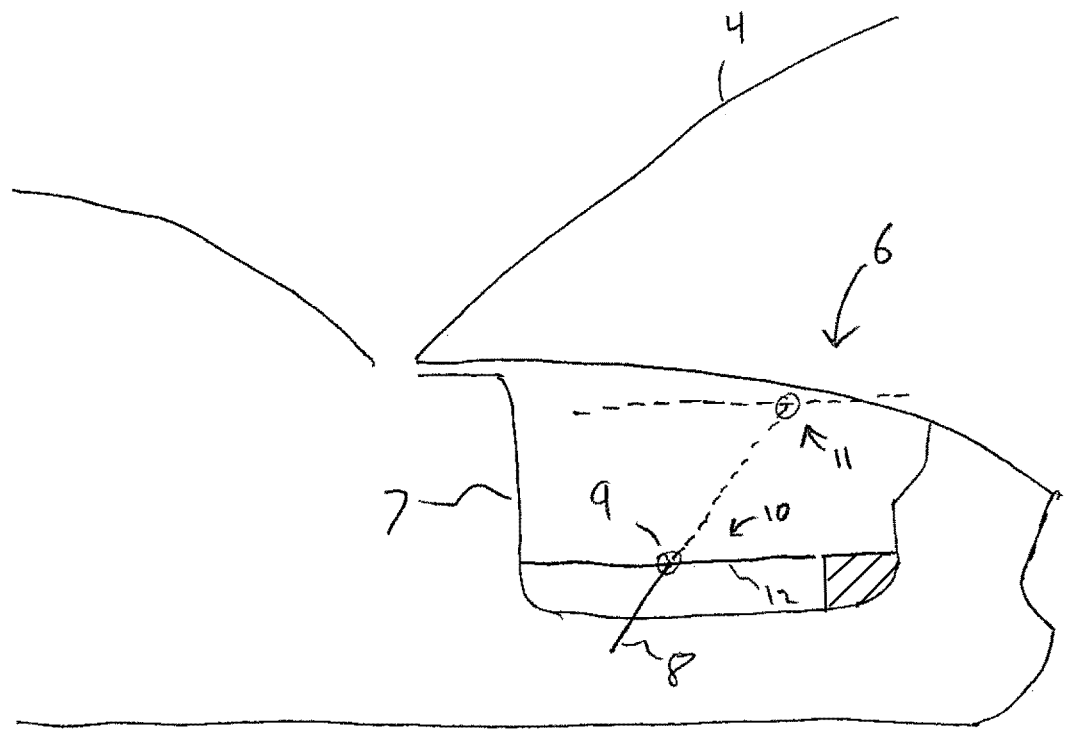
FIG. 2 is a perspective view of a motor vehicle with an exemplary embodiment of the cargo loading system.

According to an exemplary embodiment shown in FIG. 2, the cargo loading system 6 includes a compartment 7 which may be located, for example, in the trunk 5 or under the hood 4 of the vehicle. The cargo loading system may include a cargo storage device 12, and an extending rod 8 which may be connected to a suitable static portion of the vehicle. The extending rod 8 may be oriented so that the rod 8 may fully extend when the cargo storage device is repositioned. In an exemplary embodiment, the extending rod may be active and may be driven by a linear actuator such as mechanical actuators, hydraulic actuators, pneumatic actuator, or electromechanical actuators. The exemplary positioning mechanism may further include a pivot 9 which is configured to swivel the cargo storage device. While in the stored position 10 the extending rod 8 of the cargo storage device is retracted fully. In order to facilitate access to a person loading and/or unloading cargo the loading position 11 is higher than the stored position 10. The actuation of the positioning mechanism may be actuated manually or automatically. In an exemplary embodiment the manual actuation of the positioning mechanism may be of user input either remotely (i.e. from the car key fob) or from the vehicle (i.e. a button in the cargo area). The automatic actuation of the positioning mechanism may be handled by the use of sensors, for example sensors configured to detect the opening of the trunk or hood to automatically actuate the extending rods. In an alternative embodiment the sensors may also detect the presence of a personnel or user in proximity of the compartment or detect hands free gestures such as kick-activation. The cargo loading system shown in FIG. 2 may also include a pivot 9 which may be actuated via a motor. Exemplary embodiments of the motor may include rotary actuators such as electric stepper motors or servomotors. The motor may also be in mechanical communication with the extending rod to rotate the extending rod to control the movement of the cargo storage device.

Figure 3:
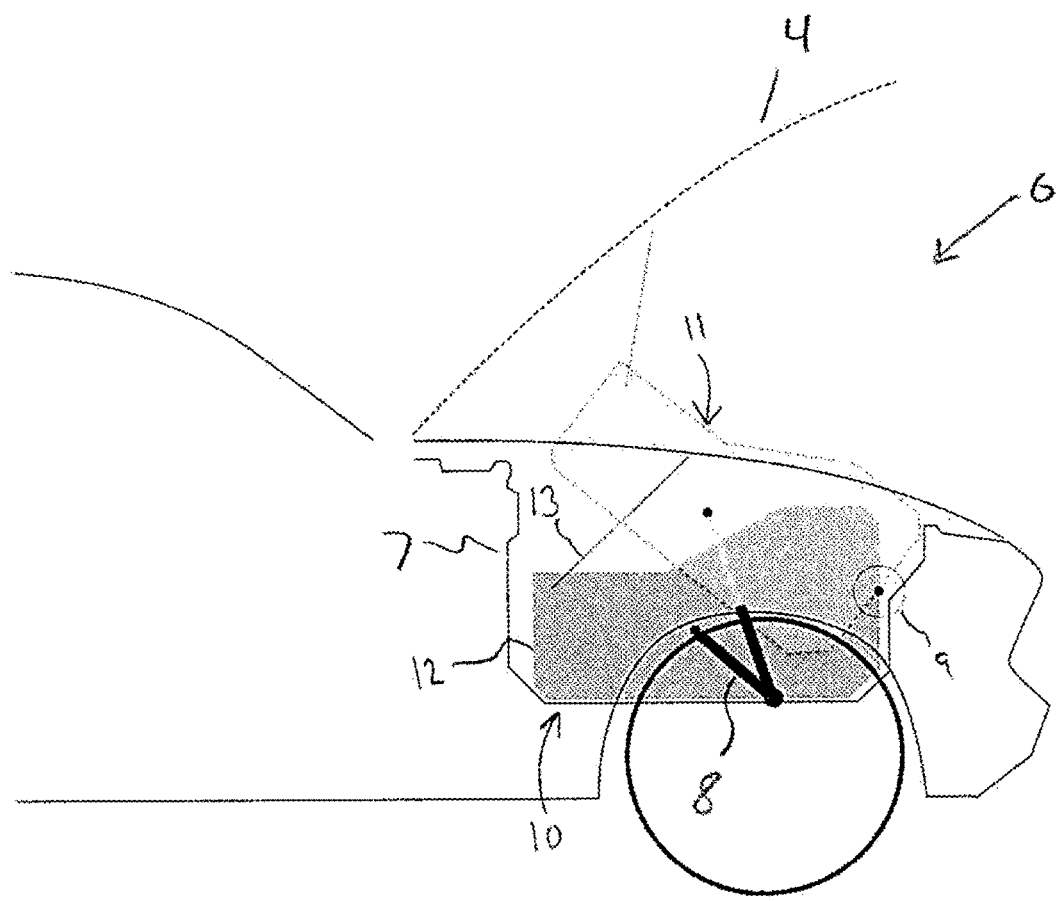
FIG. 3 is a perspective view of a motor vehicle with a cargo loading system.

According to an exemplary embodiment shown in FIG. 3, the cargo loading system 6 includes a compartment 7 which may be of the trunk 5 or the hood 4. The cargo loading system may include a cargo storage device 12, and an extending rod 8 which may be placed in a static portion of the vehicle. In this exemplary embodiment, the extending rod 8 is configured to rotate to accommodate for the movement of the cargo storage device 12. The cargo loading system shown in FIG. 3 may also include a pivot 9 which may be actuated via a motor or passively via a hinge placed on the pivot. A line 13 may be attached to an upper portion of the cargo storage device 12 configured to aid in the rotating movement of the cargo storage device. The line is also attached to the hood 4 or trunk 5 such that the opening of the hood 4 or trunk 5 pulls the cargo storage device 12 to the loading position 11. The line may be, for example, a nylon cord, metal chain or other suitable material. The resulting loading position 11 is higher than the stored position 10. In this exemplary embodiment the extending rods may be active or passive. The placement of the extending rod may depend on the requirements of the system type to aid the movement of the cargo storage device. The motor may also be in mechanical communication with the extending rod to rotate the extending rod to control the movement of the cargo storage device.

Figure 4:
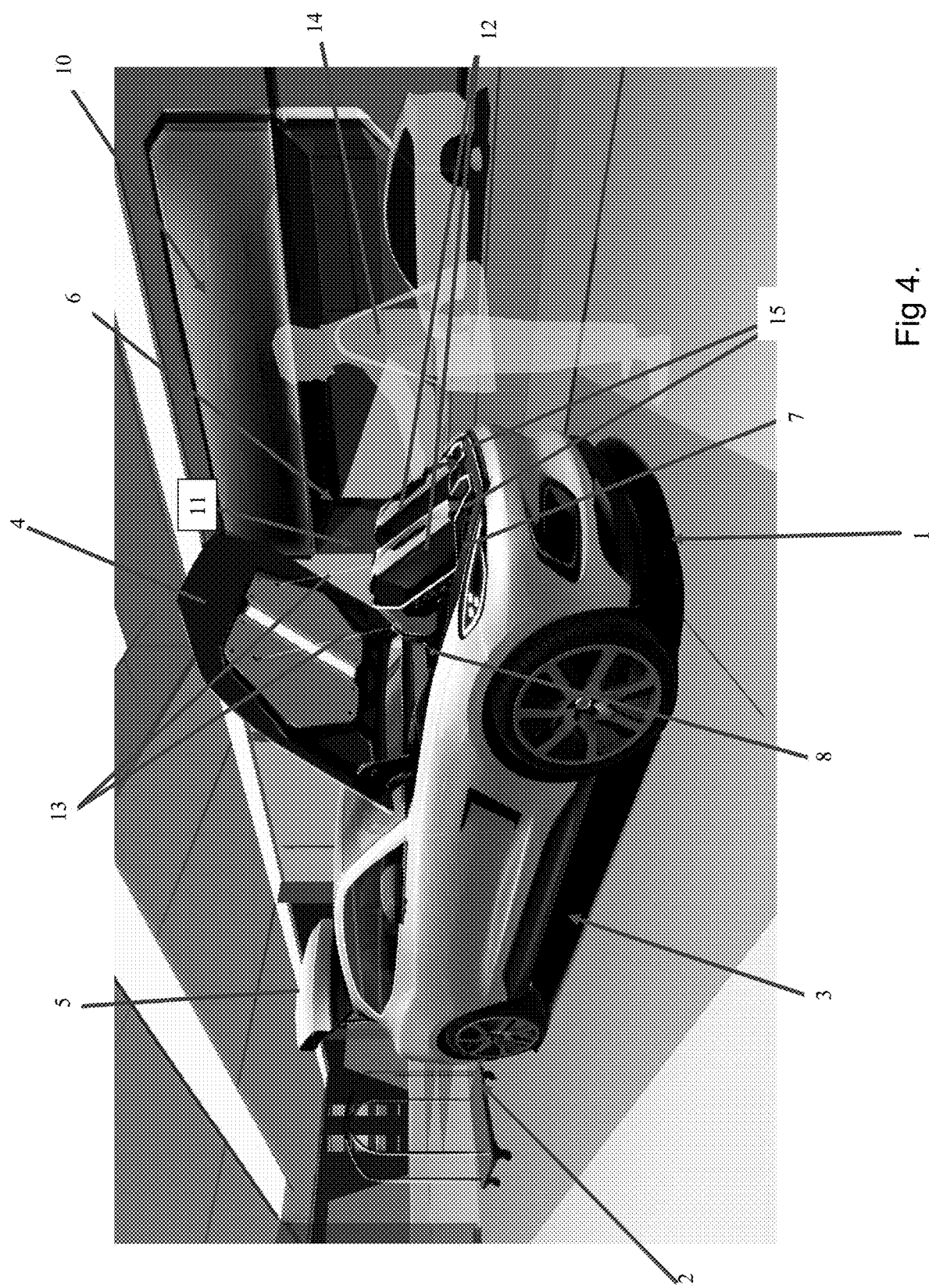
FIG. 4 is an front and right side perspective view of a motor vehicle with a cargo loading system.

According to an exemplary embodiment shown in FIG. 4, the cargo loading system 6 is shown at the front 1 of the car under the hood 4. A user 14 utilizing the loading or unloading position of the cargo storage device 12 is shown. The shown cargo loading system 6 provides easier access for the user 14 to load or unload cargo onto the storage device at its loading position 11. The cargo storage device 12 may include a lip 15 adjacent to the compartment 7, and wherein the lip 15 configured to be complementary to the compartment such that the edge of the lip conforms to the edge of the compartment 7. A plurality of lines 13 are attached to the hood 4 and corresponding storage device 12. A plurality of extending rods (only one shown) may also be provided on each side of the storage devices. As shown in FIG. 4, a plurality of containers or bins may be employed with the system.

According to an alternative embodiment, each of the bins or containers may be removably attached to a platform. The platform may be connected to the positioning mechanism. Thus, the compartment or bin configuration may be easily changed as preferred by the user based on the items being carried in the vehicle. The positioning mechanism may also be stored within the compartment so that more cargo space is available in the case that each of the bins or containers are removed.

Figure 5:
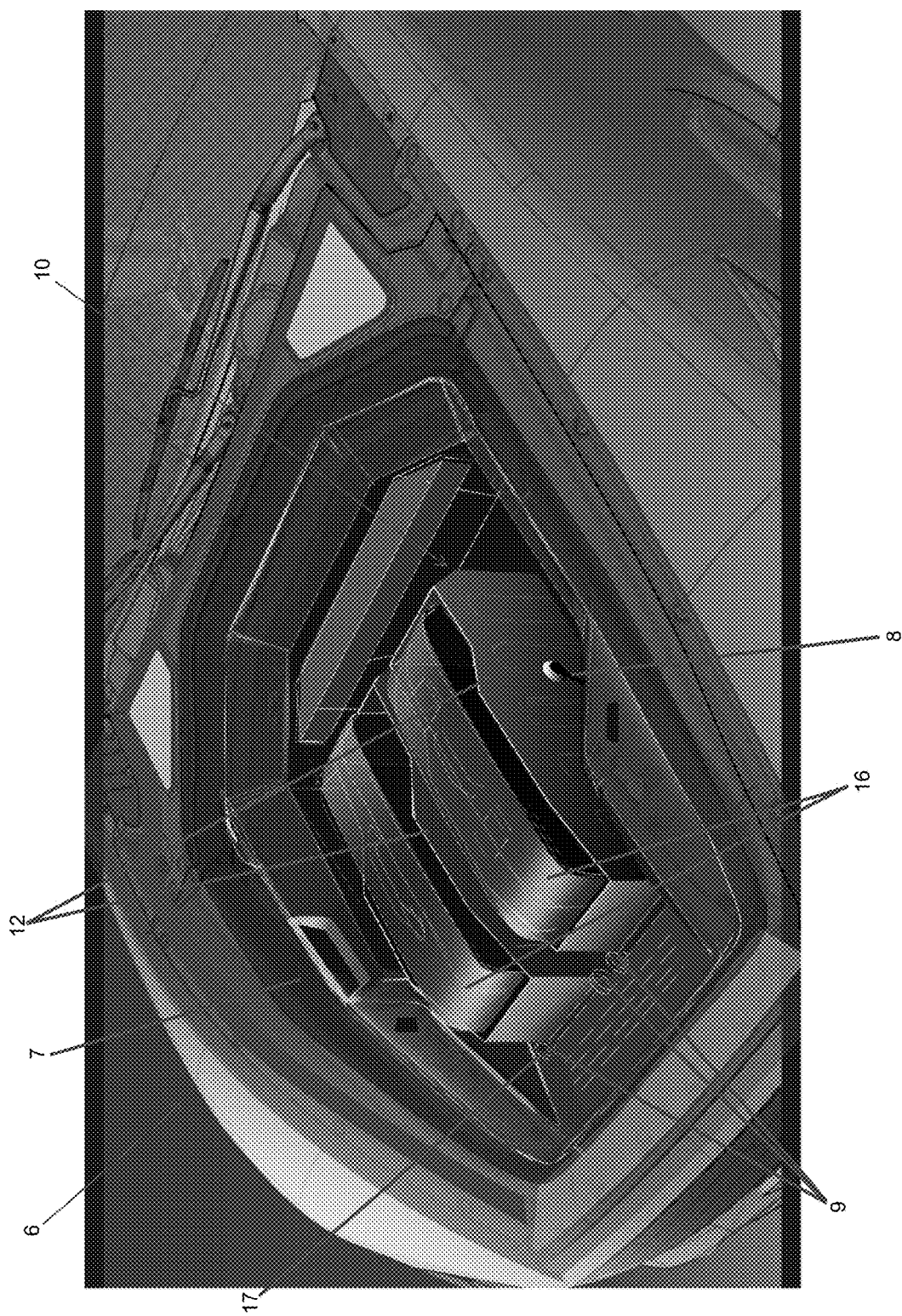
FIG. 5 is a front and left side perspective view of a motor vehicle with a cargo loading system.

According to an exemplary embodiment shown in FIG. 5, a cargo loading system 6 is shown from a front, right side perspective. The cargo storage device 12, is shown in the stored position 10. Cargo 16 is placed inside the cargo storage device 12 which is shown as a container in this exemplary embodiment. The exemplary pivot mechanism 9 is also shown attached to the compartment 7. The pivot mechanism 9 is shown as a separated configuration where each storage device 12 includes a corresponding pivot 9 attached to the compartment 7 and the storage device 12 to facilitate the rotation of the storage device 12. In this configuration, each separate storage device 12 can move individually. The exemplary pivot mechanism 9 shown in FIG. 5 rotates on a set of wheels 17 which can be rotated via a motor (not shown). The motors may be rotary actuators such as electric stepper motors or servomotors to rotate the cargo storage device 12 on the pivot mechanism 9. The motor may also be mechanically attached to the extending rod 8 to rotate the extending rod 8 to control the movement of the cargo storage device.

It is important to note that the construction and arrangement of the cargo loading system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A cargo loading system for a vehicle including a hood comprising:

a compartment located under the hood;

a cargo storage device located within the compartment, where in the cargo storage device includes a stored position and a loading position;
a positioning mechanism configured to control the movement of the cargo storage device from the stored position to the loading position;
wherein the loading position is higher than the stored position;
wherein the positioning mechanism comprises an extending rod;
wherein one end of the extending rod is directly connected to the cargo storage device and another end of the extending rod is connected to a static portion of the car; and
wherein the positioning mechanism further comprises a line attached to the hood and the cargo storage device.

2. The loading system of claim 1, wherein the extending rod is configured to extend during movement of the cargo storage device from the stored position to the loading position.

3. The loading system of claim 2, wherein the extending rod is driven by a linear actuator.

4. The loading system of claim 1, wherein the positioning mechanism is configured to pivot the cargo storage device during the movement of the cargo storage device from the stored position to the loading position.

5. The loading system of claim 2, wherein the extending rod is not driven by an actuator.

6. The loading system of claim 4, wherein the extending rod is configured to rotate with the cargo storage device.

7. A vehicle comprising:
a hood located in the front of a passenger compartment of the vehicle;
a compartment located under the hood;
a cargo storage device located within the compartment, where in the cargo storage device comprises a stored position and a loading position;
a positioning mechanism configured to control the movement of the container from the stored position to the loading position;
wherein the loading position is higher than the stored position;
wherein the positioning mechanism comprises an extending rod; and
wherein one end of the extending rod is directly connected to the cargo storage device and another end of the extending rod is connected to a static portion of the car; and
wherein the positioning mechanism further comprises a line attached to the hood and the cargo storage device.

8. The loading system of claim 7, wherein the hood is located forward of a passenger compartment of the vehicle.

9. The loading system of claim 7, wherein the extending rod is driven by a linear actuator.

10. The loading system of claim 7, wherein the positioning mechanism is configured to pivot the cargo storage device during the movement of the cargo storage device from the stored position to the loading position.

11. The loading system of claim 7, wherein the extending rod is passive.

12. The loading system of claim 10, wherein the extending rod is configured to rotate with the cargo storage device.

13. A vehicle comprising:
a hood located in the front of a passenger compartment of the vehicle;
a compartment located under the hood;
a cargo storage device located within the compartment, where in the cargo storage device comprises a stored position and a loading position;
an extending rod configured to control the movement of the cargo storage device from the stored position to the loading position;
wherein the extending rod is configured to control the movement of the cargo storage device from the stored position to the loading position;
wherein the loading position is higher than the stored position;
wherein the loading position is forward of the stored position; and
a line attached to the cargo storage device and the hood so that upward movement of the hood causes a corresponding upward movement of the cargo storage device.

14. The vehicle of claim 13, wherein the line and the extending rod is configured to pivot the cargo storage device during the movement of the cargo storage device from the stored to the loading position.

15. The loading system of claim 13, wherein the extending rod is driven by a linear actuator.

16. The loading system of claim 13, wherein the extending rod is not driven by an actuator.

17. A cargo loading system for a vehicle including a hood comprising:
a compartment located under the hood;
a cargo storage device located within the compartment, where in the cargo storage device includes a stored position and a loading position;
a positioning mechanism configured to control the movement of the cargo storage device from the stored position to the loading position;
wherein the loading position is higher than the stored position; and
wherein the positioning mechanism further comprises a line attached to the hood and the cargo storage device.

18. A vehicle comprising:
a hood located in the front of a passenger compartment of the vehicle;
a compartment located under the hood;
a cargo storage device located within the compartment, where in the cargo storage device comprises a stored position and a loading position;
a positioning mechanism configured to control the movement of the container from the stored position to the loading position;
wherein the loading position is higher than the stored position; and
wherein the positioning mechanism further comprises a line attached to the hood and the cargo storage device.

* * * * *